April 19, 1949.  H. P. KUPIEC  2,467,434
SERVOMOTOR AND PRESSURE RESPONSIVE
VALVE THEREFOR
Filed May 10, 1947  2 Sheets-Sheet 2
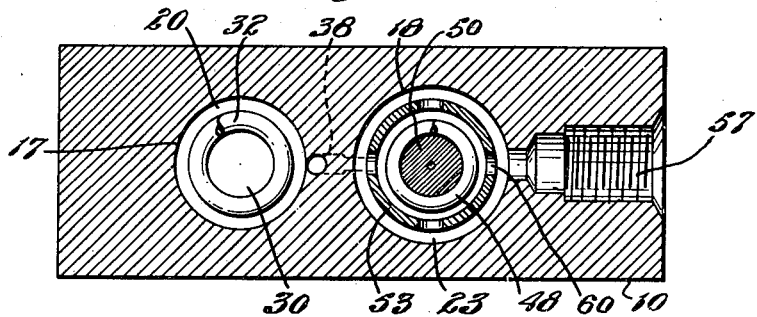
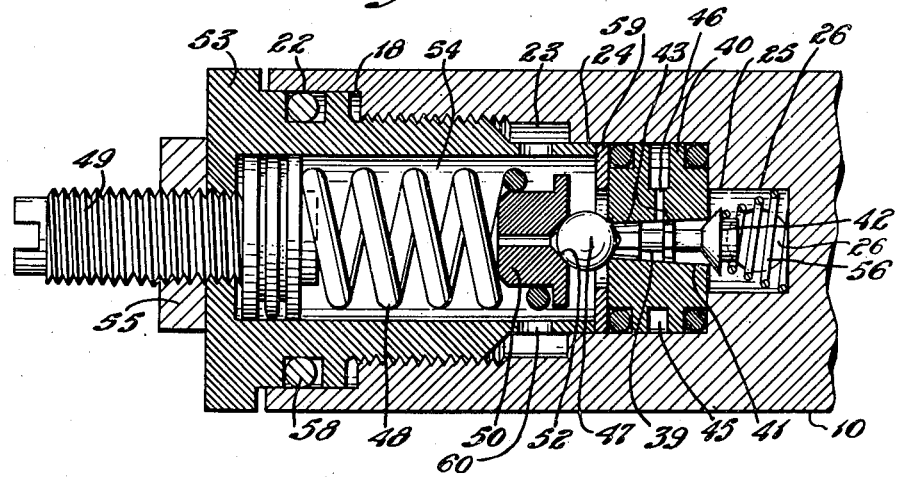
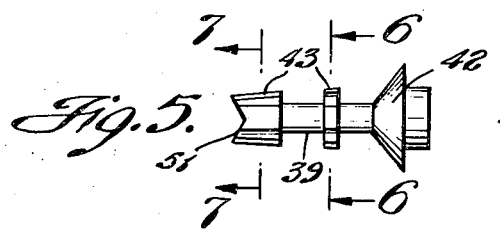
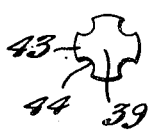
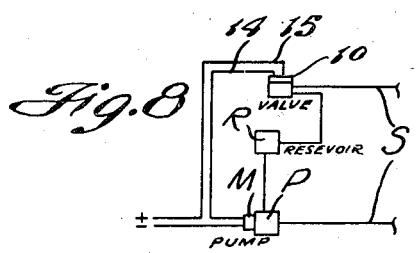
INVENTOR
HARRY P. KUPIEC
BY Clark & Ott
ATTORNEYS Patented Apr. 19, 1949

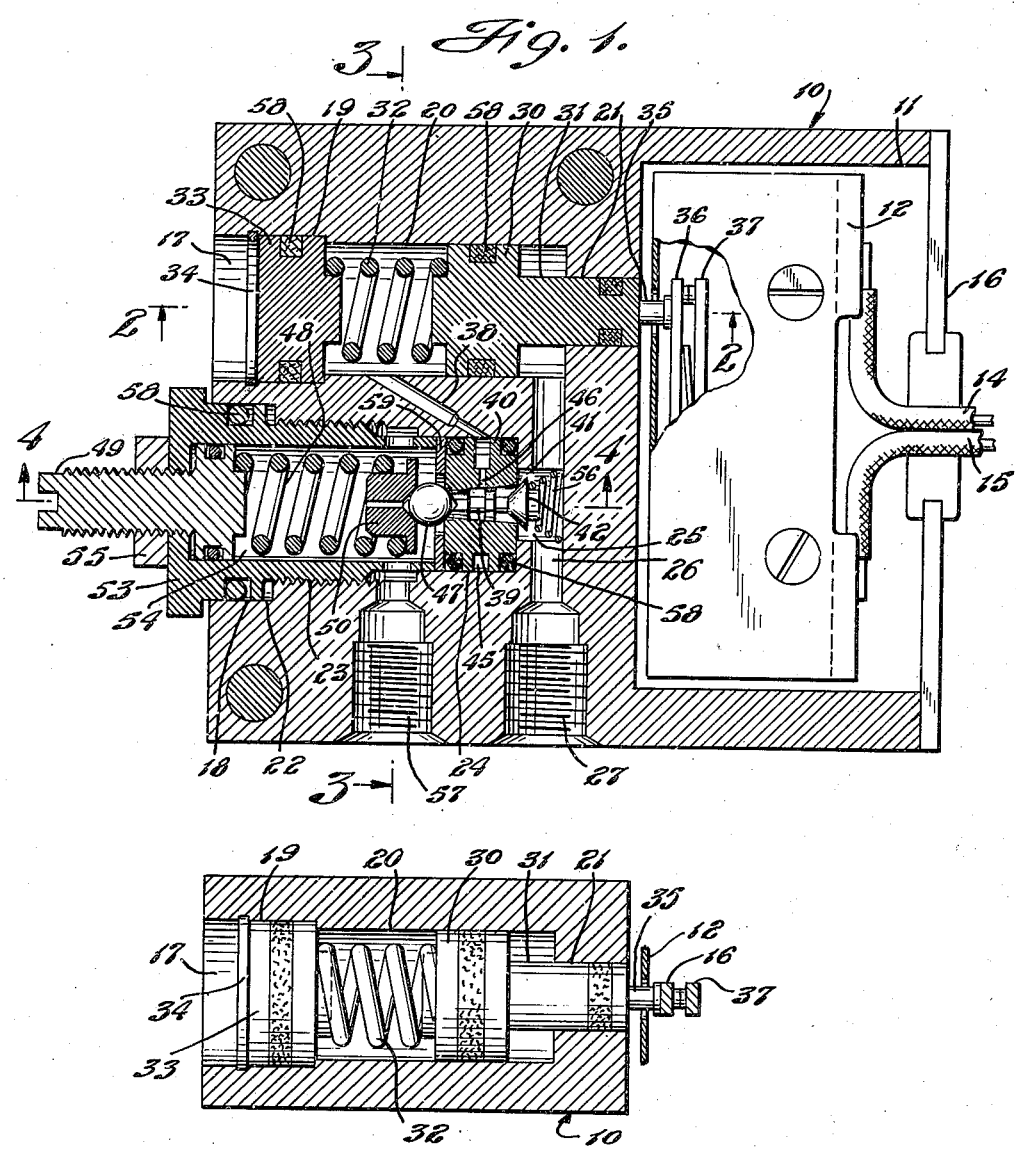

2,467,434

UNITED STATES PATENT OFFICE 2,467,434

SERVOMOTOR AND PRESSURE RESPONSIVE VALVE THEREFOR

Harry P. Kupiec, Paramus, N. J., assignor to Air Associates, Incorporated, Teterboro, N. J., a corporation of New Jersey Application May 10, 1947, Serial No. 747,295

3 Claims. (Cl. 121—38)

This invention relates to a hydraulic pressure control valve for maintaining a predetermined pressure range of the fluid in a hydraulic system.

The invention has in view a hydraulic valve for controlling the pressure of the fluid in a hydraulic system for opening and closing gun turrets, bomb bays and the like and for raising and lowering landing gear, wing flaps and the like and for operating sheet stamping presses, punch presses and other machine tools.

The invention has for an object the provision of a hydraulic valve which is automatic in operation and which is adapted to be set for operation at low pressures as well as at relatively high pressures.

The invention has for a further object a hydraulic valve of said character which is adjustable to obtain the desired pressure range or the minimum and maximum presures in the system.

The invention has for a further object the provision of a hydraulic valve which is actuated by fluid pressure in the system for maintaining the pressure therein by controlling the operation of an electrically driven pump through an electric switch actuated by the valve.

More particularly the invention has for an object the provision of a hydraulic valve which automatically actuates an electric switch for throwing into operation the electric motor of a motor driven pump for building up the pressure in the system when the pressure therein approaches a predetermined minimum and for throwing out of operation the motor of said motor driven pump when the pressure in the system approaches a predetermined maximum.

In the drawings:

Fig. 1 is a longitudinal horizontal sectional view through a servo-motor and a pressure responsive valve therefor constructed in accordance with the invention and illustrating the same in association with an electric switch.

Fig. 2 is a fragmentary transverse sectional view taken approximately on line 2—2 of Fig. 1.

Fig. 3 is a similar view taken approximately on line 3—3 of Fig. 1.

Fig. 4 is a fragmentary transverse sectional view taken approximately on line 4—4 of Fig. 1.

Fig. 5 is an enlarged view of one of the valve elements.

Fig. 6 is a transverse sectional view taken approximately on line 6—6 of Fig. 5.

Fig. 7 is a similar view taken approximately on line 7—7 of Fig. 5.

Fig. 8 is a fragmentary plan view of a hydraulic system showing the arrangement of the valve 10 therein.

Referring to the drawings by characters of reference, the device includes a servo-motor and valve body 10 of any desired configuration and which as illustrated is of rectangular formation in longitudinal and transverse cross-section and is formed with a rectangular recess 11 in which is secured an electric switch 12 having conductor ends 14 and 15 extending through a cover 16 secured to the body 10 to close the side of the recess 11.

The servo-motor and valve body 10 is provided with parallel bores 17 and 18 which open through the side wall thereof opposite to that formed by the cover 16. The bore 17 is progressively reduced to provide concentric bore portions 19, 20 and 21, the bore portion 21 being innermost and communicating with the rectangular recess 11. The bore 18 is also progressively reduced to provide concentric bore portions 22, 23, 24 and 25, the bore portion 25 being innermost and communicating with a transverse passageway 26 which opens into the inner end of the bore portion 20 and is enlarged at its outer end and opens through the side wall to form the inlet port 27.

Located within the bore portion 20 of the bore 17 for reciprocatory movement therein is a plunger 30 formed with a reduced inner end 31 which is slidably fitted in the inner bore portion 21. The plunger 30 is engaged by a coiled expansion spring 32 interposed between the outer end thereof and the inner end of a plug 33, which plug is fitted in the outer bore portion 19 and is secured in position therein by a snap ring 34. The reduced inner end 31 of the plunger 30 is provided with a reduced head 35 disposed in engagement with a terminal 36 of the electric switch 12. The expansion spring 32 tensions the plunger 30 against the terminal 36 to normally retain the same in closed relation with the fixed terminal 37 thereof.

Hydraulic fluid is admitted to the inner end of the bore portion 20 through the inlet port 27 and the passageway 26 which fluid is exerted against the inner end of the plunger 30 in opposition to the tension of the expansion spring 32. In order to augment the pressure against the outer end of the plunger 30 hydraulic fluid is admitted thereto through a duct 38 opening at one end into the chamber formed in the bore portion 20 between the plunger 30 and the plug 33 and at its opposite end the duct 38 opens into the bore portion 24 of the bore 18.

The flow of the fluid through the duct 38 is controlled by a reciprocatory valve element 39 guidedly mounted in a centrally apertured annular element 40 located at the inner end of the bore portion 24 with the bore 41 of the apertured element 40 disposed in alignment with the axis of the bore 18. The valve element 39 protrudes through the bore 41 of the annular element 40 and is formed with an enlarged frusto-conical shaped protruding end 42 which is adapted to seat against and close the inner end of the bore 41. The valve element 39 is provided with a plurality of fluted annular ribs 43 arranged on the periphery thereof which slidably fit the bore 41 so as to permit of the free reciprocatory movement of the valve element therein and which also permits of the flow of the fluid through the flutes 44 in the bore 41.

The annular element 40 is formed with an annular recess 45 in the periphery thereof and with a duct 46 opening at one end into said recess 45 and at its opposite end opening into the bore 41. By this construction hydraulic fluid admitted to the bore 41 by the valve element 39 passes through the duct 46 into the recess 45 and from the recess 45 through the duct 38 into the chamber at the outer end of the plunger 30 to thereby augment the pressure against the outer end of the plunger, it being understood that the plunger is reciprocated in the bore portion 20 by the differential of pressure on the inner and outer ends thereof.

A ball valve element 47 is seated against the outer end of the valve element 39 and the same is tensioned for moving the valve element inwardly so as to open the inner end of the bore 41 and to close the outer end of said bore by engagement of the ball valve element against the outer face of the annular element 40 in covering relation with the outer end of the bore 41. A coiled expansion spring 48 interposed between the enlarged inner end of an adjusting screw 49 and a flanged element 50 tensions the ball valve element 47 against the valve element 39. The ball valve element 47 engages in a conical depression 51 in the outer end of the valve element 39 and in a conical depression 52 in the inner face of the flanged element 50. The flanged element 50 protrudes through the innermost convolutions of the expansion spring 48 and the adjusting screw 49 is threadedly engaged in the outer end of a screw cap 53 for varying the tension of the expansion spring 48 so as to establish the desired predetermined pressure at which the plunger 30 will be moved inwardly to actuate the electric switch 12. The screw cap 53 is threadedly secured in the bore 18 so as to close the outer end thereof and the same is formed with a cylindrical bore 54 opening through the inner end thereof in which is arranged the enlarged inner end of the adjusting screw 49 and the expansion spring 48. A lock nut 55 threadedly engaged on the outer end of the adjusting screw 49 is adapted to be tightened against the outer face of the screw cap 53 for locking the adjusting screw in set position. The valve element 39 is tensioned by a coiled expansion spring 56 interposed between the frusto-conical end 42 thereof and the wall of the passageway 26 for resiliently retaining the valve element 39 in engagement against the ball valve element 47.

As illustrated in Figs. 1 and 4 of the drawings, the valve element 39 is shown in open relation with the inner end of the bore 41 to thereby permit of the flow of the fluid in the system into the bore 41 and thence through the duct 46, recess 45, duct 48 and into the chamber in the bore portion 20 betwen the plunger 30 and the plug 33 so as to move the plunger inwardly and maintain the terminal 36 of the switch 12 in closed relation. The conductors 14 and 15 of the switch 12 are connected in circuit with an electric motor M of a motor driven pump P which is connected in the hydraulic system S for suplying the fluid pressure in said system. When the switch 12 is thus moved to closed relation the motor M is placed in operation to drive the pump P.

In order to prevent too frequent opening and closing of the inlet and outlet ends of the bore 41 preferably a differential in pressure is provided at which the valve element 39 is moved to open the inlet end and close the outlet end of the duct 41 and to open the outlet end and close the inlet end thereof. This differential between the "cutting in" and "cutting out" of the valve element 39 is obtained by the relative areas of the inlet and outlet ends of the bore 41. The bore 41 is of slight tapered formation with the inlet end which is closed by the frusto-conical end 42 of the valve element 39 being of slightly larger area than the outlet end which is closed by the ball valve element 47. The annular element 40 may be provided with any desired size of bore 41 to produce the desired differential. The valve is adapted to operate at relatively low pressure and at high pressures ranging from 1,300 to 3,000 lbs. per square inch in the system depending upon the particular use or apparatus to be operated by the pressure in the system. For a predetermined pressure of 2,000 lbs. per square inch in the system, the spring 48 would be set so that when the pressure in the system reaches the set predetermined pressure the valve element 39 would be moved outwardly to close the inlet end of the duct 41 to thereby effect the movement of the switch 12 to open relation. At such predetermined pressure, the duct 41 would be tapered to provide a reduced opening at the outer end so that when the pressure in the system has dropped to approximately 1,900 lbs. per square inch or a differential of 100 lbs., the ball valve element 47 would be moved by the spring 48 to close the outlet end of the duct 41 so as to admit fluid to the inlet end of said duct to thereby effect a closing of the switch 12. By this construction the motor driven pump is in operation for a period of time to build up the pressure in the system from 1,900 lbs. per square inch to 2,000 lbs. per square inch and is then out of operation until the pressure in the system has dropped again to 1,900 lbs. per square inch.

When the pump is out of operation the ball valve element 47 is in open relation with the outlet end of the duct 41 to permit of the discharge of the fluid through the outlet port 57 to the reservoir R.

The pressure at which the valve element 39 "cuts out" the operation of the pump is the maximum pressure in the system while the pressure at which the valve element "cuts in" to effect operation of the pump is the minimum pressure in the system. The maximum pressure is established by the tension set on the spring 48 while the minimum pressure is obtained by the outlet end of the bore 41 being relatively smaller in cross-sectional area than the inlet end thereof.

The plunger 30, plug 33, screw cap 53 and the annular element 40 are each formed with peripheral recesses in which any desired type of packing 58 is arranged for preventing leakage of the fluid past the peripheries of said members. It will be seen that the screw cap 53 is tightened against an annulus 59 interposed between the inner end thereof and the annular element 40 for retaining said annular element in position at the inner end of the bore portion 24. The screw cap 53 is formed with openings 60 through the side wall thereof for permitting of the discharge therethrough of the fluid to the piping leading to the reservoir R.

What is claimed is:

1. In a servo-motor and a pressure responsive device to control its operation, a servo-motor and valve body having a pressure chamber, a reciprocatory plunger arranged in said chamber and tensioned for movement in one direction, an inlet port communicating with said chamber at one side of the plunger for admitting fluid under pressure against said plunger for moving the same in the opposite direction, a second chamber in said body, an outlet port in communication with said last mentioned chamber, a passageway in said body having inlet and outlet openings at its opposite ends in communication respectively with the inlet and outlet ports, said outlet opening being of smaller cross-sectional area than the inlet opening, said body having a duct opening into said first named chamber at the other side of the plunger and opening at its opposite end into said passageway, a valve element mounted for reciprocatory movement in said passageway for controlling the inlet opening thereof and the flow of the fluid from the inlet port through said duct and into said first named chamber against said plunger for effecting movement thereof, a ball valve element seated against said reciprocatory valve element and spring means in said second named chamber tensioning said ball valve element and said reciprocatory valve element against the pressure of the fluid in the inlet port, and the pressure of said spring and the cross-sectional areas of said inlet and outlet openings in said passageway establishing the pressure in the inlet port at which the reciprocatory valve element is moved to close the inlet opening into said passageway and the pressure in the inlet port at which the ball valve element is moved to close the outlet opening of said passageway.

2. In a servo-motor and a pressure responsive device to control its operation, a servo-motor and valve body having a pressure chamber, a reciprocatory plunger arranged in said chamber and tensioned for movement in one direction, an inlet port communicating with said chamber at one side of the plunger for admitting fluid under pressure against said plunger for moving the same in the opposite direction, a second chamber in said body, an outlet port in communication with said last mentioned chamber, a passageway in said body having inlet and outlet openings of relatively different cross-sectional areas in communication respectively with the inlet and outlet ports, said body having a duct opening into said first named chamber at the other side of the plunger and opening at its opposite end into said passageway, a valve element mounted for reciprocatory movement in said passageway for controlling the inlet opening thereof and the flow of the fluid from the inlet port through said duct and into said first named chamber against said plunger for effecting movement thereof, a ball valve element seated against said reciprocatory valve element and adapted to close the outlet port of said passageway, and spring means in said second named chamber tensioning said ball valve element and said reciprocatory valve element against the pressure of the fluid in the inlet port, and the tension of said spring and the cross-sectional areas of said inlet and outlet openings in said passageway establishing the pressure of the fluid in the inlet port at which the reciprocatory valve element is moved to close the inlet opening into said passageway and the pressure of the fluid in the inlet port at which the ball valve element is moved to close the outlet opening of said passageway.

3. In a servo-motor and a pressure responsive device to control its operation, a servo-motor and valve body having a pressure chamber, a reciprocatory plunger arranged in said chamber and tensioned for movement in one direction, an inlet port communicating with said chamber at one side of the plunger for admitting fluid under pressure against said plunger for moving the same in the opposite direction, a second chamber in said body, an outlet port in communication with said last mentioned chamber, a passageway in said body having inlet and outlet openings of relatively different cross-sectional areas in communication respectively with the inlet and outlet ports, said body having a duct opening into said first named chamber at the other side of the plunger and opening at its opposite end into said passageway, valve elements for respectively closing said inlet and outlet openings for controlling the flow of the fluid from the inlet port through said duct and into said first named chamber against said plunger for effecting movement thereof, and spring means in said second named chamber tensioning said valve elements against the pressure of the fluid in the inlet port, and the pressure of said spring and the cross-sectional areas of said inlet and outlet openings in said passageway establishing the pressure in the inlet port at which one of the valve elements is moved to close the inlet opening into said passageway and the pressure in the inlet port at which the other valve element is moved to close the outlet opening of said passageway.

HARRY P. KUPIEC.

REFERENCES CITED

The following references are of record in the file of this patent:

UNITED STATES PATENTS

| Number | Name | Date |
|---|---|---|
| 627,903 | Cash | June 27, 1899 |
| 1,138,278 | Castle | May 4, 1915 |
| 1,175,089 | Turner | Mar. 14, 1916 |
| 1,529,434 | Hynes | Mar. 10, 1925 |

FOREIGN PATENTS

| Number | Country | Date |
|---|---|---|
| 685,216 | France | Mar. 31, 1931 |